Figure 1:
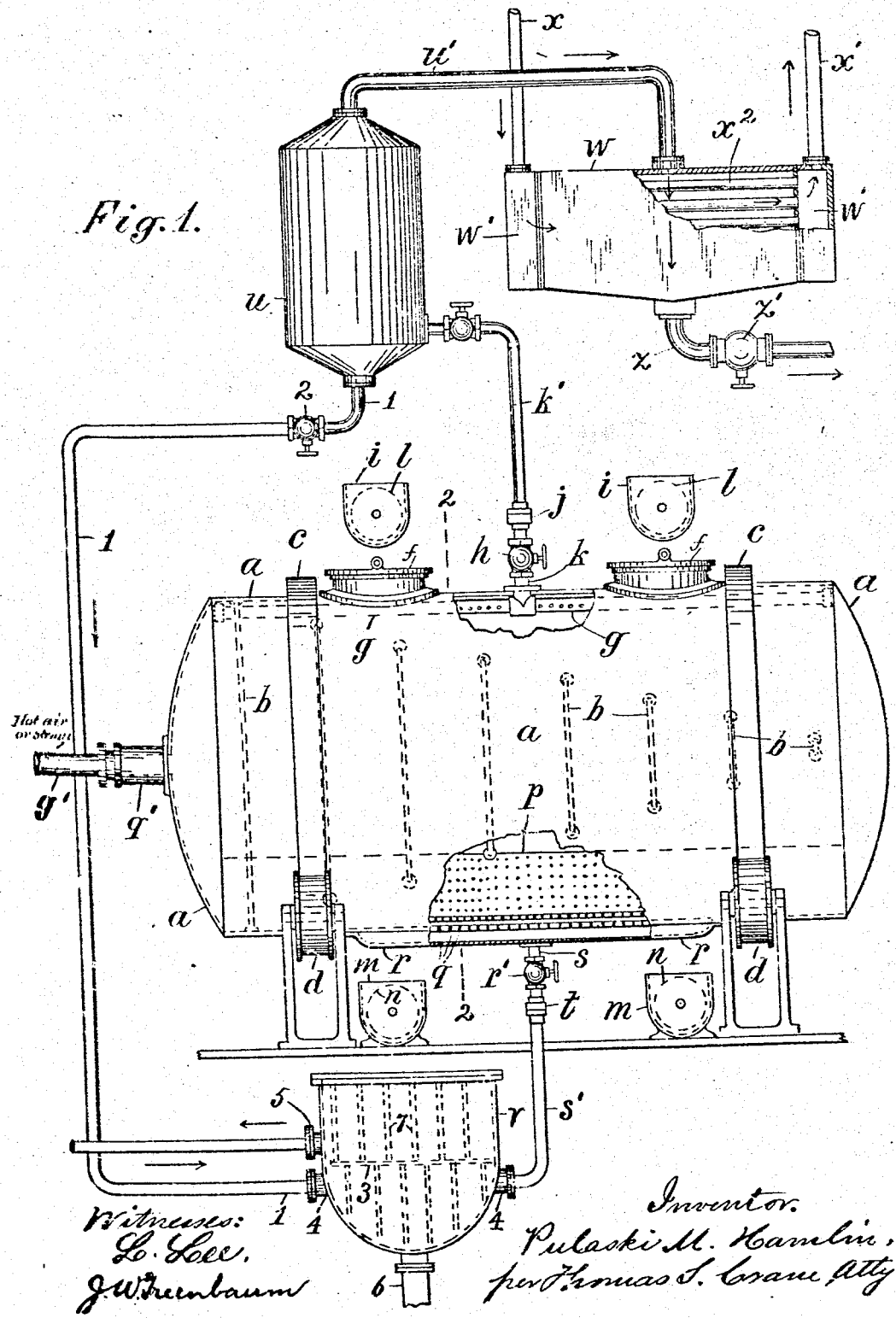

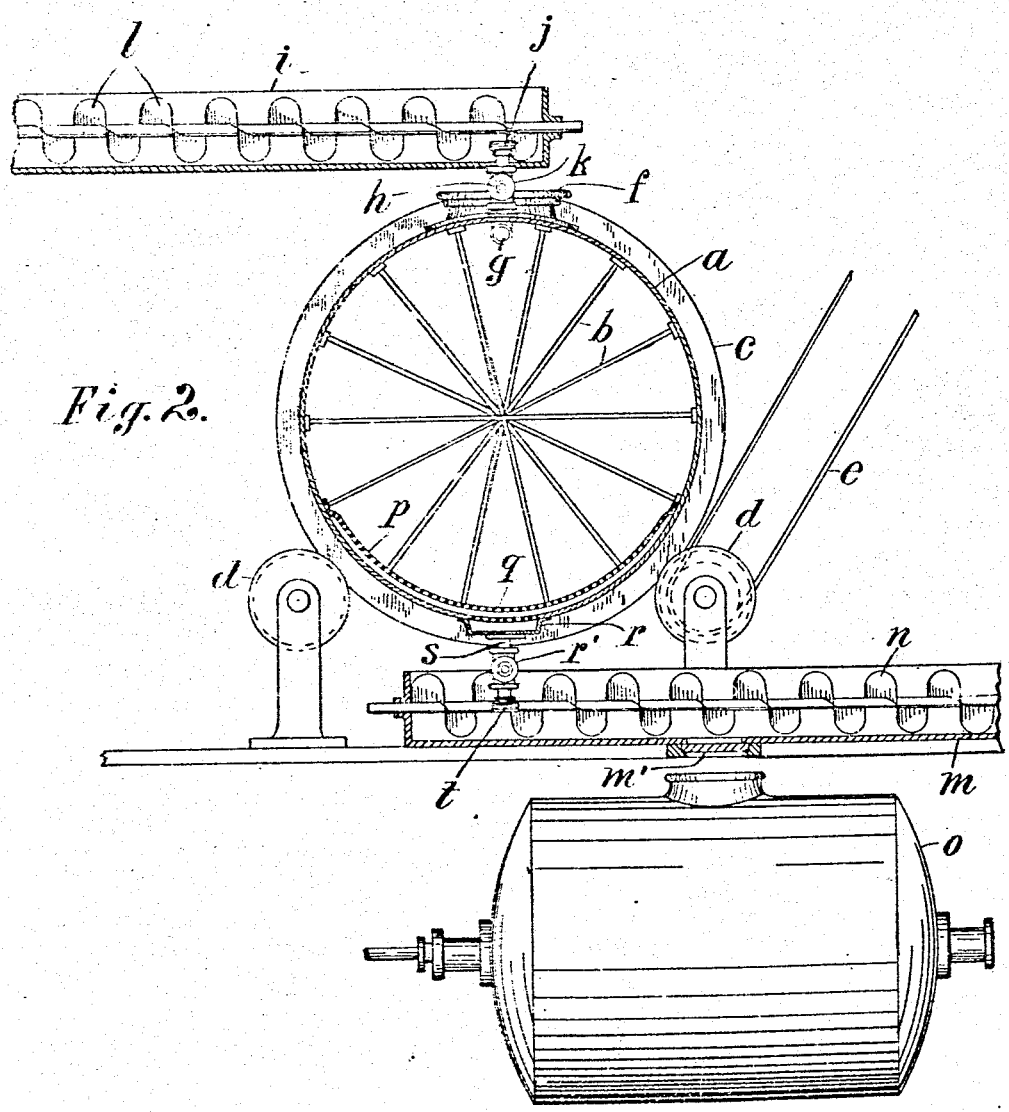

UNITED STATES PATENT OFFICE.

PULASKI M. HAMLIN, OF PITTSTON, PENNSYLVANIA, ASSIGNOR OF ONE-HALF TO CHARLES H. UNVERZAGT, OF NEW YORK, N. Y.

APPARATUS FOR THE RECOVERY OF BY-PRODUCTS.

990,862.

Specification of Letters Patent.

Patented May 2, 1911.

Application filed March 17, 1909. Serial No. 484,012.

*To all whom it may concern:*

Be it known that I, PULASKI M. HAMLIN, a citizen of the United States, residing at Pittston, (R. F. D. 2,) county of Luzerne, and State of Pennsylvania, have invented certain new and useful Improvements in Apparatus for the Recovery of By-Products, fully described and represented in the following specification and the accompanying drawings, forming a part of the same.

The object of the present invention is to recover by-products from wood or straw in the process of or before treatment for other purposes and also where they are mere waste materials as in the case of sawdust and sawmill waste, and by-products resulting from the treatment of any other materials which contain resin, pitch, tars, turpentine, oils, acids, or other products capable of being volatilized or melted or extracted by heat. Such products are found in coniferous woods throughout the world, and can be recovered by this invention, which is also intended to treat sawmill waste for the recovery of the by-products, and to deliver such treated material to the boilers of sawmills, for fuel purposes. It is also intended to treat pulpwood for separating the by-products therefrom before the wood is subjected to the digesters in which it is converted into fiber.

The appliances consist of a rotary boiler, condensers for chilling the vaporous and fluid elements which are separated from the material, means within the boiler for delivering the vaporous elements and the liquid elements separately, and detachable couplings for connecting such means at intervals with the condensers to receive the vaporous and liquid elements from the boiler. It is well known that the extraction of such elements can be effected in the best manner by removing a portion of such elements at intervals from the material, and the boiler in the present invention is made capable of rotation, but is brought to rest at intervals, and the coupling connected with the condensers for the purpose of conveying the vapors and liquids to such condensers. Stay-rods are disposed within the recovery boiler in such manner as to agitate and to open up the mass of chipped wood or other material which is under treatment. The material in the boiler may be heated by the use of saturated or superheated steam, or by hot air, and it may be treated by chemicals in solution or in a dry state, depending upon the nature of the material. The top of the boiler is connected when removing the by-products, with a water cooled condenser adapted to condense the more volatile elements as turpentine, etc., and the bottom of the boiler at such time is connected with an air-cooled condenser adapted to condense the more dense and gummy elements, as rosin, pitch and tar. The apparatus also includes conveyers for delivering the material into the boiler without handling, and for removing the material in a similar manner after the by-products have been extracted, the invention thus furnishing a means of recovering the by-products with little expense.

The present invention furnishes a means to bring into intimate relation with the heating agent every particle of wood or other material being treated in the recovery boiler, and enormously diminish the labor required in handling the material before and after treatment, as the exhausted material can be conveyed without appreciable cost directly into the pulp digesters or other appliances used for the treatment of such materials.

The invention is particularly adapted for the recovery of the by-products contained in sawdust, planer-shavings, and all kinds of sawmill waste, thus rendering extremely valuable what is now a useless material and which is annually destroyed in enormous quantities by burning, to prevent its accumulation.

The invention will be understood by reference to the annexed drawing, in which—

Figure 1 is an elevation in diagrammatic form of the recovery apparatus with a part of the rotary boiler broken away to show the interior; and Fig. 2 is a cross section on line 2—2 in Fig. 1 with the addition of a disintegrating digester.

*a* designates a horizontal cylindrical recovery boiler having internal braces *b* to resist a pressure from 30 to 60 pounds per square inch, and such braces operate efficiently to agitate and open up the material as the boiler revolves. The boiler is supported in a horizontal position upon two track-bands *c* running upon flanged truck-wheels *d* which can be rotated when desired by any suitable means, as the belt *e* shown in Fig. 2. Manholes *f* are shown with suitable covers upon one side of the boiler and a vapor-pipe $g$ is extended along and secured to the inside of the boiler shell adjacent to the manholes, and has an outlet pipe $k$ extended through the shell of the boiler and provided outside the shell with a cock $h$ and coupling $j$. The ends of the pipe $g$ are plugged, and it is formed with numerous perforations to discharge the vapor from the boiler when distilled from the material therein. The manholes are made of sufficient size to fill and empty the boiler quickly, and conveyer-troughs $i$ are shown extended over the path of the manholes and provided with conveyer screws $l$ which operate to propel any material which is delivered into the troughs to the manholes when they are opened upon the top side of the boiler. Other conveyer-troughs $m$ are shown arranged below the path of the manholes when at the bottom of the boiler and provided with gate $m'$ and conveyer-screws $n$, the troughs being adapted to receive the material discharged from the manholes when opened at the bottom of the boiler and the screws to convey the same through the gate to a disintegrating digester indicated diagrammatically at $o$ in Fig. 2, or to any other place of delivery.

Inside the boiler about one inch from the side and conforming to its contour and extending from head to head for about one-third of the circumference is a perforated screen $p$ which is so secured that the material cannot get under the same but the liquid ingredients can be drained from the boiler, through such screen. The shell of the boiler along the center line of the screen is perforated with holes $q$, and a leader $r$ is riveted tightly to the shell of the boiler, outside the line of such perforations, which forms a trough to collect all the liquid which drains through the holes $q$. The leader $r$ has a discharge-pipe $s$ which is provided with a cock $r'$ and a coupling $t$, which serves to connect the leader with the trap $v$ when the boiler is arrested. The holes $q$ through the shell of the boiler furnish a free delivery for the denser extracts which are separated from the wood, and which would be discharged but slowly if delivered through a single hole to an outlet pipe. The leader serves to collect the fluid discharged from all of these holes and then deliver it to the air-cooled trap.

At one end of the boiler upon its axial line an inlet-pipe $g'$ is inserted through a stuffing-box $q'$ so that the pipe remains stationary when the boiler is rotated. Steam or hot air may be admitted through this pipe to heat the material in the boiler, and chemicals in solution or in a dry state may be put in through the manholes.

The couplings $j$ and $t$ are employed at times to connect the pipes $k$ and $s$ with delivery pipes $k'$ and $s'$ leading respectively to a receiving-tank $u$ and an air-cooled trap or condenser $v$. Snap-couplings are preferably used, secured by springs rather than screw-threads, and which can be readily connected and detached.

The top of the receiving-tank is connected by pipe $u'$ with a tubular surface condenser $w$, one end of which is broken away to show the usual arrangement of tubes $w^2$ packed tightly in heads upon the body of the condenser, with chambers $w'$ at opposite ends having inlet and outlet pipes $x$, $x'$, through which water is circulated to cool the tubes. The vapors from the receiving-tank pass outside of the tubes and the condensed product is discharged by the pipe $z$ having cock $z'$. A pipe 1 having cock 2 connects the bottom of the receiving-tank with the air-cooled trap $v$. The trap shown herein is fully illustrated in a Patent No. 960,512, granted to me June 7, 1910, for means for recovering by-products, and has a perforated horizontal partition 3 below which the fluids to be condensed are admitted by an inlet 4, and above which the uncondensed vapors are discharged by an outlet 5. A delivery-pipe 6 at the bottom of the trap discharges the condensed liquids. Perforated baffle-plates 7 are extended upward and downward from the partition 3, and the partition and baffle-plates are all perforated to permit the movement of the vapors through the trap while arresting and chilling such products as resin, pitch and tar, which would clog a tubular condenser, but which readily work their way downward to the delivery-pipe 6.

The operation of the apparatus is as follows: When charging the boiler it is held stationary with the manholes open upon its upper side, and chipped, crushed or broken wood sawdust, planer-shavings or other material to be treated is brought to the boiler by the conveyer $l$, and emptied into the manholes $f$. Such conveyer can take the chipped wood or other material directly from the chipper's source of production, and thus wholly avoid any manual labor in handling the material. When a suitable charge of material is placed in the boiler, the manholes are closed steam-tight, and by rotating the truck-wheels $d$ the boiler is slowly revolved while the steam or hot air is being admitted. The rotation of the boiler slowly changes the position of each particle of material in relation to the steam or hot air in the boiler, and the braces $b$ operate to separate and open up the mass of material in the boiler so that steam or hot air injected through pipe $g'$ is able to attack every particle of material under treatment. When the material to be treated is in a finely divided state and therefore liable to pack closely if treated in a stationary boiler, it is constantly agitated by the rotary action of my boiler which works the finely divided material into small balls and forms it into a granular mass which prevents packing and readily allows the by-products to escape. The turpentine and other volatile by-products pass upward through the material and accumulate at the top of the boiler, and when the boiler has been rotated a sufficient time to volatilize the turpentine, oils, &c., and melt out the resin, pitch, and other heavy by-products, it is stopped with the outlet valve $r'$ at the bottom. The pipes $s'$ and $k'$ are then connected to the couplings $t$ and $j$, and the cocks $r'$ and $h$ are opened. The turpentine and other volatile by-products then pass through the cock $h$ and pipe $k'$ into the receiving tank $u$, in which they are slightly chilled so that any of the denser elements fall to the bottom of the tank, and pass to the trap $v$ by pipe 1, as indicated by the arrows adjacent the said pipe, the remainder passing through the pipe $u'$ into the surface condenser $w$, where they are wholly condensed and discharged by the cock $z'$ to any desired receptacle. While the boiler is standing still, the heavier by-products drain from the material through the screen and are collected in the leader from which they flow through the cock $r'$ into the trap $v$.

A water-cooled condenser would chill such products as tar or pitch and resin so rigidly that they would adhere to the surface upon which they were deposited and would not flow out of their receptacle; but the air-cooled trap operates by its numerous perforated partitions which conduct the heat to the shell and cover of the trap, to arrest these products and leave them in a semi-fluid condition so that they can flow from the discharge-pipe 6 of the trap. When the flow of such products ceases, the cocks $h$ and $r'$ are closed, the pipes $k'$ and $s'$ uncoupled, and the boiler again rotated so that the material is sub-divided and opened up by the braces $b$ and thoroughly penetrated by the steam or hot air which is introduced through the axial pipe $g'$. After a suitable interval, the boiler is again stopped, the pipes $s'$ and $k'$ re-connected, and the by-products again withdrawn, and this operation may be repeated as long as the wood or other material continues to furnish such products. It is well known that when a portion of the extracted elements is removed the remainder can be extracted with more facility, as it exposes the materials in the boiler more freely to a renewed action of the heat or chemical agents employed; and my apparatus thus permits the material to be treated over and over in the boiler, and the distilled elements removed at intervals. As soon as the by-products are wholly extracted, the manholes are opened and the boiler is then rotated, such movement of the boiler operating to work the exhausted material out through the manholes from whence it drips into the conveyers $m$, from which it is carried to any desired destination and without any manual labor. If chipped wood is the material treated, it may be further treated to convert it into fiber and for that purpose it may be delivered into a disintegrating digester $o$, where it will be treated in the usual manner. Where the exhausted material is not desired for a future manufacturing purpose, it may be delivered to the firebox of a steam boiler and used as fuel to generate, if necessary, steam or hot air to operate the recovery apparatus.

Several of the recovery boilers $a$ can be operated at a time and the same conveyers operate to deliver the material to all of the said boilers through properly arranged gates as $m'$ in the bottom of the conveyer troughs. A single conveyer will operate to receive the exhausted material from a series of boilers and deliver it to any desired point.

From the above description it is obvious that the apparatus is almost automatic in its operation, requires very little attendance, and can be utilized to obtain valuable by-products from waste material as well as from the wood which is intended for producing wood fiber. In the later case, the apparatus operates upon the wood in a separate process from the disintegrating or fiber-making process.

I have referred to the introduction of dry chemicals at times through the manhole in treating of certain materials for the removal of by-products, and it will be understood that dry chemicals would be used in some cases where the material, as wood chips or shavings, are already wet; and in cases where sufficient water is already present in the material to extract the by-products, it is preferable to heat the material with compressed hot air instead of steam, as the use of steam would, by its condesation, increase the amount of water in the recovery boiler. Hot air is especially advantageous where the treated material is to be used as fuel, and the alternate use of steam and compressed hot air is especially advantageous where the material treated is of a hard dense nature, as the steam is efficient in penetrating and opening the pores of the material; while alternate treatments with the compressed hot air and a final treatment with such hot air avoids the introduction of much moisture into the boiler so that the exhausted material is much better adapted for fuel purposes.

Having thus set forth the nature of the invention what is claimed herein is:

1. In a recovery apparatus, a horizontal boiler having means for rotating it when desired and an inlet for a heating fluid upon its axial line, one or more manholes for filling and emptying the boiler, a segmental curved screen within the lower part of the boiler, means for discharging through the side of the boiler the liquid strained through the screen with a pipe, cock and detachable coupling thereon, a horizontal vapor-pipe extended along the shell of the boiler next the inner side opposite to the screen, with an outlet-pipe, a cock and detachable coupling for delivering the vapors when the boiler is arrested.

2. In a recovery apparatus, a horizontal boiler having means for rotating it when desired and an inlet for a heating fluid upon its axial line, one or more manholes for filling and emptying the boiler, a segmental curved screen within the lower part of the boiler, means provided with a discharge-pipe for discharging through the side of the boiler the liquid strained through the screen, an air-cooled condenser, a detachable connection from such discharge-pipe to the air-cooled condenser, a horizontal perforated vapor-pipe extended along the shell of the boiler next the inner side opposite to the screen, an outlet-pipe connected with such vapor-pipe and extended through the side of the boiler, a surface-condenser and a detachable connection from such outlet-pipe to the surface-condenser, the whole operating to distil the two classes of by-products from the material in the boiler and to discharge them separately to condensers of different characters when the boiler is arrested.

3. In a recovery apparatus, a horizontal boiler having means for rotating it when desired, and an inlet for heating fluid upon its axial line, one or more manholes for filling and emptying the boiler, a segmental curved screen within the lower part of the boiler, means provided with a discharge-pipe for discharging through the side of the boiler the liquid strained through the screen, an air-cooled condenser and a detachable connection from such discharge-pipe to the same, a horizontal perforated vapor-pipe extended along the shell of the boiler next the inner side opposite to the screen, an outlet-pipe connected with such vapor-pipe, a receiving-tank and means for detachably connecting such outlet-pipe with the receiving-tank, a connection from the bottom of such tank to the air-cooled trap, and a water-cooled condenser with connection from the same to the top of the said receiving-tank, the receiving-tank thus separating the heavier ingredients from the vapor and discharging them to the air-cooled trap and discharging the lighter ingredients to the water-cooled condenser.

In testimony whereof I have hereunto set my hand in the presence of two subscribing witnesses.

PULASKI M. HAMLIN.

Witnesses:
 JESSIE G. VANDINE,
 G. C. TAYLOR.